Figure 7:
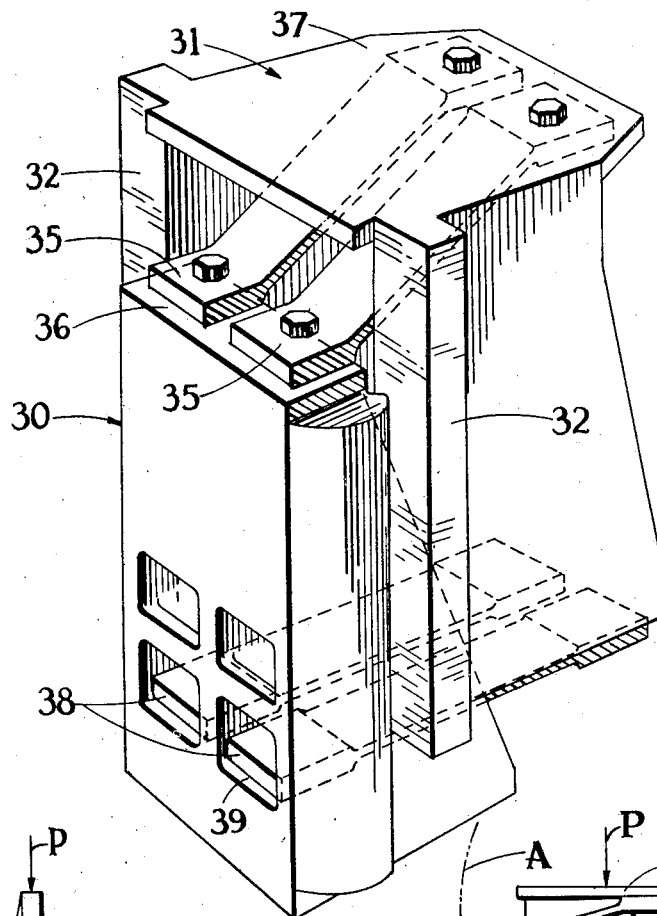

April 12, 1949. G. B. MARTIN 2,467,090
CONTROL APPARATUS
Filed Nov. 29, 1945 4 Sheets-Sheet 1
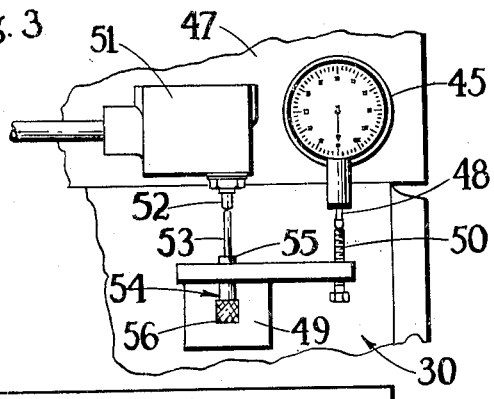
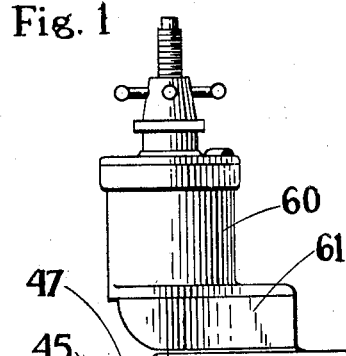
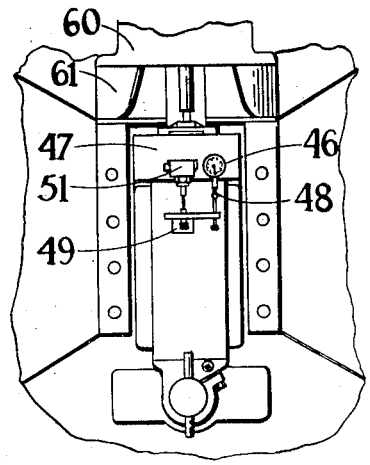
INVENTOR.
George B. Martin
BY *Michael Williams*
ATTORNEY

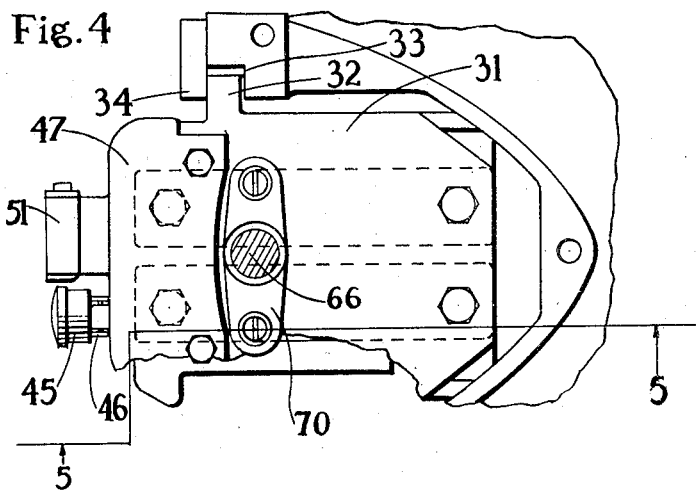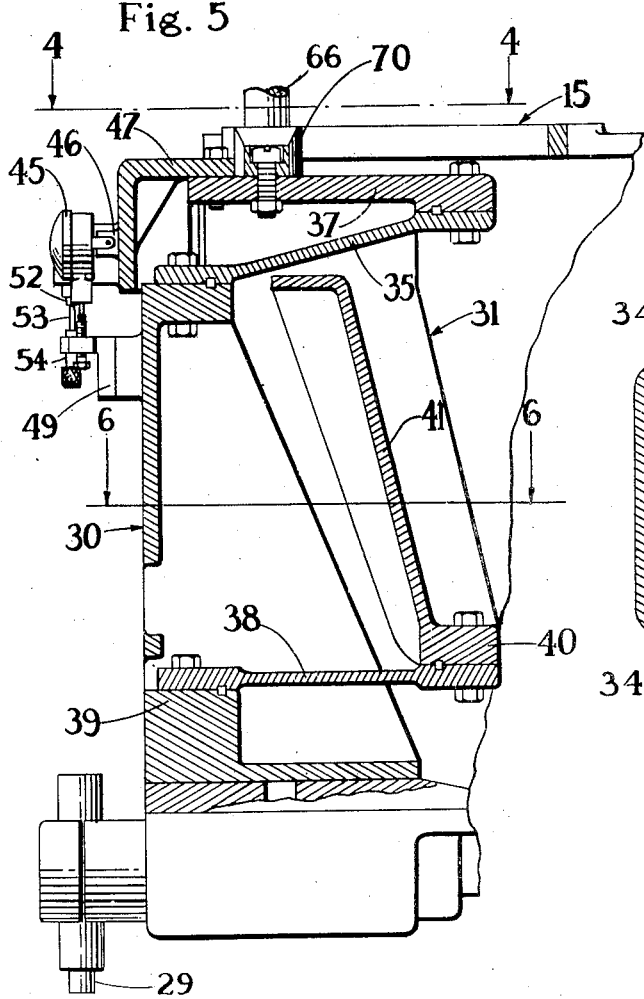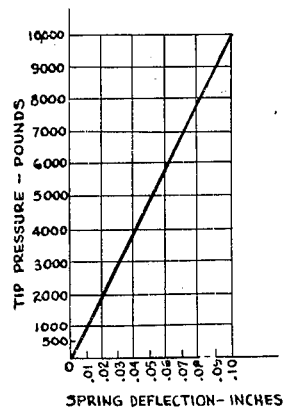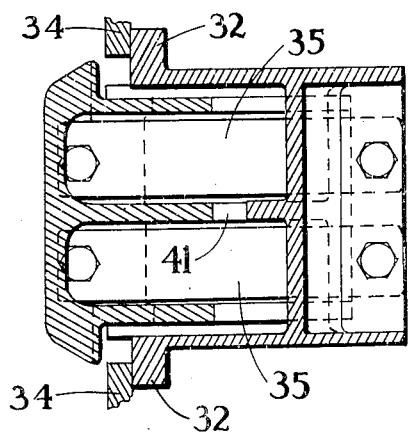

April 12, 1949.   G. B. MARTIN   2,467,090
CONTROL APPARATUS
Filed Nov. 29, 1945   4 Sheets-Sheet 3

INVENTOR.
George B. Martin
BY
Michael Williams
ATTORNEY

April 12, 1949.    G. B. MARTIN    2,467,090
CONTROL APPARATUS
Filed Nov. 29, 1945    4 Sheets-Sheet 4

INVENTOR.
George B. Martin
BY
*Michael Williams*
ATTORNEY

Patented Apr. 12, 1949

2,467,090

UNITED STATES PATENT OFFICE 2,467,090

CONTROL APPARATUS

George B. Martin, Detroit, Mich., assignor to Federal Machine & Welder Company, Warren, Ohio, a corporation of Ohio Application November 29, 1945, Serial No. 631,611

16 Claims. (Cl. 219—4)

This invention relates to control apparatus, and more particularly to such apparatus for use in the art of electrical resistance welding, and the principal object of this invention is to provide new and improved apparatus of this character.

Figure 8:
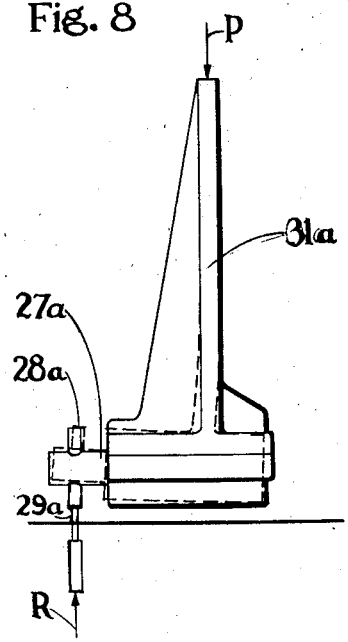
Figure 9:
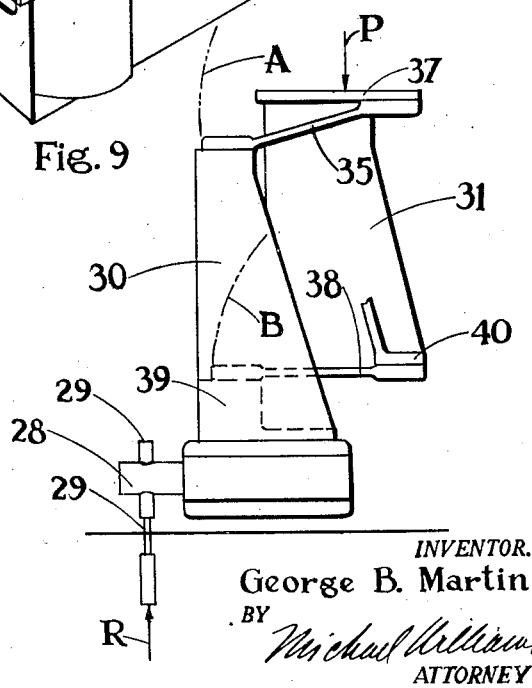
Figure 10:
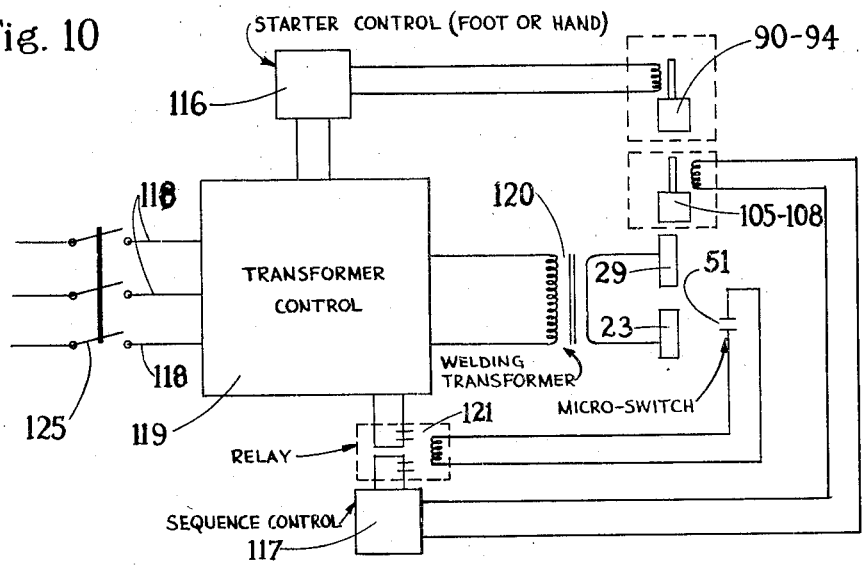
Figure 11:
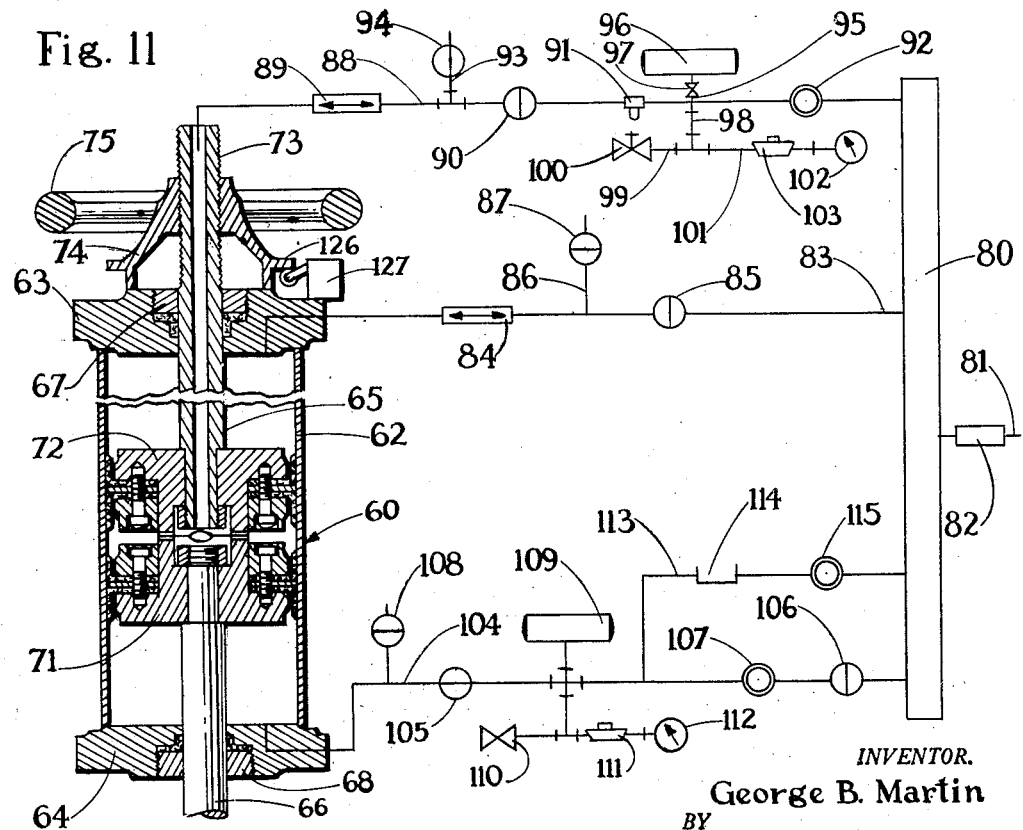

In the drawings accompanying this specification, and forming a part of this application, there is shown, for purposes of illustration, an embodiment which the invention may assume, and in this drawing:

Figure 1 is a side elevational view of a spot welding machine, illustrating an embodiment of the invention, Figure 2 is a fragmentary front elevational view of the machine shown in Figure 1, Figure 3 is an enlarged fragmentary detail of a part of the machine shown in Figure 2, Figure 4 is an enlarged fragmentary sectional view of a top portion of the machine, corresponding generally to line 4—4 of Figure 5, Figure 5 is a vertical sectional view corresponding generally to the line 5—5 of Figure 4, Figure 6 is a transverse sectional view corresponding generally to the line 6—6 of Figure 5, Figure 7 is a perspective view illustrating in detail certain parts of the invention, Figures 8 and 9 are generally diagrammatic views showing certain principles of the prior art and the present invention, respectively, Figure 10 is a diagrammatic representation of the electrical connections, Figure 11 is a diagrammatic representation of the fluid connections, and Figure 12 is a chart illustrating characteristics of a portion of the embodiment herein disclosed.

The invention is applicable to any apparatus having relatively movable parts, wherein it is desired to urge one part in the direction of the other to weld or clamp material therebetween, particularly where the work surface recedes from the part being urged, as is the case in welding. This invention provides means whereby the urged part follows-up the receding work surface, without diminishment of pressure, thus to insure proper contact between the work and the parts. This is especially desirable in case of electrical resistance welding where the work piece in contact with the dies softens due to flow of electric current therethrough. With the use of my invention, the movable die closely follows up the receding work surface so that the dies are held in good welding contact with the work piece, and burning of such piece because of arcing, or an improper weld because of change in resistance, or other difficulties, is prevented.

This invention makes possible the design of a work engaging member, such as what might be termed in this case the auxiliary slide or head, or the electrode or horn carrier, having substantially no friction losses and having also a low inertia, so as to assure that this work engaging member closely and accurately follows the work surface.

The feature of a frictionless and low inertia head combines well with construction providing for a quick change from welding pressure to forging pressure, since there is substantially no lag to be considered.

The embodiment of the invention further provides means which at least lessen the tendency of movement of the work engaging member along the surface of the work piece. This also is particularly desirable in resistance welding machines, such as spot welders, to prevent improper welds caused by skidding of the welding points along the work piece.

The foregoing and other features and objects will be apparent from the following detailed description of the invention.

The invention, as shown in the drawing, is shown as applied to a spot welder, but it is particularly pointed out that such showing is only for the purpose of illustrating one practical form of the invention, and that the invention is not limited to the specific form herein disclosed.

Referring particularly to Figure 1 of the drawings, the spot welder herein shown comprises an upright housing 15, containing a transformer 16, of any suitable design, having a secondary 17.

The front of the housing 15 carries a lower arm or knee 18, and this arm is mounted for adjustment vertically by means of slotted apertures (not shown) and bolts 19. The lower arm 18 has a bearing portion cooperating with a bearing cap 20 for the purpose of clamping the lower horn 21 in position. The lower horn 21 carries the lower point holder 22, and the latter in turn carries the welding point 23. As shown at 24, the lower arm 18 has connection with one side of the transformer secondary 17.

The other side of the secondary 17 is connected, by means of a flexible lead 25, to an upper horn clamp 26, carrying the upper horn 27. The upper point holder 28 and the upper welding point 29 are removably and adjustably carried by the upper horn 26 in the usual manner.

An upper horn carrier 30 supports the upper horn 26, and parts carried thereby, and this entire sub-assembly might be generally termed a work engaging member, since the invention is not necessarily limited to resistance welding.

The upper horn carrier 30 is generally a free floating member, supported from a slide 31 which is held to movement along ways on the housing 15. As herein shown, the slide 31 has oppositely projecting guide surfaces 32 (see especially Figures 4 and 7) held to movement along ways 33 of the housing 15, by means of gibs 34.

The upper horn carrier 30 and slide 31 are interconnected in such manner that the horn carrier 30 normally moves with the slide 31 except when opposition to movement is encountered by the upper welding point 29. In such case there will be a predetermined amount of relative movement between the horn carrier 30 and slide 31.

The connection between horn carrier 30 and slide 31 preferably has resilient characteristics, and in the embodiment herein shown, and at the present time preferred, such connection takes the form of spaced-apart leaf springs, each having one end connected to the horn carrier and the opposite end connected to the slide. The term "leaf spring" is here used to include single and multiple leaf springs.

Referring particularly to Figures 5 and 7 of the drawings, a pair of spaced upper springs 35 is provided, each having its forward end bolted to the upper end 36 of the horn carrier 30, and its rearward end bolted to the under surface of a top plate 37 forming part of the slide 31. A lower pair of springs 38 is also provided, each having its forward end bolted to a ledge 39 located at the lower end of the horn carrier 30, and its rearward end bolted to the bottom ledge 40 of the slide 31. Each end of the springs 35 and 38 is preferably keyed to its support, largely to remove excess strain on the bolt connections. The slide 31 is provided with a web 41 for structural strength purposes.

Referring particularly to Figure 5, it will be seen that the opposite ends of the upper springs 35 are disposed in different planes, and that the intermediate portion angles from one end to the other. The lower springs 38 are substantially flat, preferably having no angle at all. The springs 35 and 38 and the relative position of the horn carrier 30 and slide 31 are shown in Figure 5 in the position they assume when no force is imposed on the slide 31 and no load opposes movement of the horn carrier 30. In effect, the springs 35 and 38 generally provide parallel linkage connection between the horn carrier and slide 31.

It is desirable to maintain a constant relation between point pressure, that is the pressure of the upper point 29 against the work, and spring deflection, which permits relative movement between the horn carrier 30 and the slide 31. Accordingly, it will be appreciated that the design and choice of material for the spring means is of some importance. For at least certain types of welding operations, a forged steel containing about 80% carbon and hardened to about 40–42 C Rockwell, has been found suitable, although it will be appreciated that such specifications are given only to disclose one example of the embodiment of the invention, and that the invention is not limited thereto. Likewise, although for certain applications, it has been found suitable to provide the upper spring 35 with a 23° angularity, it will be appreciated that this angle may be varied without departing from the spirit of the invention.

However, it is desirable that the springs 35 and 38 deflect uniformly with the load imposed thereon, and for that reason their design and the choice of material requires careful consideration. The material hereinbefore specified, and the design as illustrated in the drawings, have proven very satisfactory, but it will be appreciated that different requirements may dictate a change in material, or design, or both. Calculations of deflection against pressure, of springs constructed in accordance with the present disclosure, are illustrated in the graph shown by Figure 12.

Attention is directed to Figures 8 and 9, wherein is shown, graphically, certain functions of the resilient connection between the upper horn carrier 30 and the slide 31. Figure 8 shows the prior art construction, comprising a slide 31a, which, like the slide 31, is adapted to be held to movement along ways on a housing similar to the housing 15. The slide 31a carries the upper horn 27a, upper point holder 28a, and upper welding point 29a. Pressure is applied to the slide 31a, as indicated by the arrow P, to urge the slide downward, so that the point 29a engages the work piece. The work piece, and the lower tip provide resistance, indicated by the arrow R, to the pressure P, and there is a tendency for the slide and/or the parts carried thereby to deflect. Such deflection may or may not take the form shown in dotted lines in Figure 8, but in any event, there is a tendency for the upper welding point 29a to tilt so that its upper end inclines rearwardly, causing the point to skid along the work piece. It has been found that both the upper and lower points deflect, but that the deflection of the lower point is relatively small as compared with the deflection of the upper point, so that a condition arises wherein the upper and lower points are not directly opposite to each other during welding. This produces many undesirable results, such as burning of the tips and excessive wear, marking and burning of the work piece, and poor welds, to name a few.

A graphic representation is shown in Figure 9 of the co-action of parts in this invention. It will be evident that any relative movement between the upper horn carrier 30 and the slide 31 will cause the upper springs 35 to move substantially along the arc A, whereas the lower springs 38 move substantially along the arc B. Such movements tend to impart a tilting action to the horn carrier 30, so that its lower end is urged rearwardly (to the right with reference to Figure 9), and such urging force opposes tilting caused by the deflection shown in dotted lines in Figure 8. Thus, it will be obvious that undesirable skidding of the points will at least largely be prevented.

The resilient connection between the horn carrier 30 and slide 31 performs an additional function which will now be explained.

During the welding operation, the metal between the welding tips softens, but in prior art constructions, such for example as shown in Figure 8, the slide possesses such high inertia, caused by its weight and the fact that it necessarily must fit the ways and gibs with close tolerances, that the pressure on the slide is not sufficient to cause the upper welding tip to follow the work, thus causing arcing, burning, change in electrical resistance and the like, all resulting in poor welds.

To increase the pressure to overcome the inertia of the slide would cause undesirable marking of the work piece.

My invention provides means whereby the upper tip is caused to accurately follow the receding work surface. As the slide 31 is urged downwardly, this urging force is transmitted to the horn carrier 30 by means of the springs 35 and 38. Thus, the springs are under stress at all times that urging force is applied to this slide 31. The springs, being stressed to approximately the urging force on the slide, provide stored energy which will constantly urge the welding point 29 against the work piece. If the work surface recedes, during softening of the metal, the force stored in the springs will maintain the point 29 properly against the work surface. This is largely possible because the horn carrier 30 floats on the springs and is frictionless and has low inertia.

My invention contemplates the provision of means for firing or initiating the welding operation at a predetermined time and when the pressure of the points 23 and 29 against the work piece is at a predetermined adjustable amount. To indicate the pressure between the welding points 23 and 29, I provide a deflection meter 45 mounted on a projection 46 formed on a cap 47 which is bolted to the top 37 of the slide 31. The deflection meter 45 has the usual reciprocable plunger 48. A bracket 49 is carried by the upper horn carrier 30, and is provided with a screw threaded aperture which receives an adjusting cap screw 50. The deflection meter 45 measures the amount of relative movement between the horn carrier 30 and slide 31, and since this deflection represents the amount of flexing of the springs 35 and 38, which flexing is in direct proportion to the pressure applied to the slide 31, the deflection meter actually measures the amount of pressure between the welding points 23 and 29. The meter 45 may be calibrated in any suitable manner to show a desired reading, such as pounds pressure or decimal deflection.

Also carried by the cap 47 is a micrometer type electric switch 51, having electrical connection as will later be explained. The switch 51 has the usual operating plunger 52, and cooperable with this plunger is the spindle 53 of a micrometer 54, the frame 55 of which is securely held in the bracket 49. Rotation of the barrel 56 of the micrometer 54 moves the extremity of the spindle 53 towards or away from extremity of the plunger 52, adjustment being made to actuate the switch and cause firing of the welder at a selected pressure. To set the switch 51, the points 23 and 29 are brought together with the desired pressure, indicated on the deflection meter 45, and the micrometer spindle is then adjusted to engage the plunger 52 to operate the switch. In this manner, the flow of current between the points 23 and 29 may be controlled to flow exactly at the time the proper pressure is reached, thus insuring uniformity of welds.

The slide 31 is moved along its ways, in a direction toward and away from the work, by a fluid pressure motor 60 which is carried by a bracket 61 supported from the top of the housing 15. Referring particularly to Figure 11, the motor 60 comprises a cylinder 62, closed at its opposite ends by headers 63 and 64, each respectively slidably receiving a piston rod 65 and 66, packing joints 67 and 68 being respectively provided to seal against leakage. The lower end of the piston rod 66 is secured to a collar 70 (see Figures 4 and 5) which is attached to the top 37 of the slide 31. The upper end of the piston rod 66 is secured to a piston 71 of the double acting type. Secured to the lower end of the piston rod 65 is a piston 72, also of the double acting type.

The upper end of the piston rod 65 is provided with external screw threads 73, and threaded on this portion of the rod 65 is the hub 74 of a hand wheel 75. The hub 74 bears against the adjoining upper surface of the header 63 and its adjusted position on the rod 65 determines the position of the piston 72 within the cylinder 62.

The pressure system herein disclosed has been designed for operation through the use of air under pressure, although it will me appreciated that any other suitable fluid may be used.

The pressure system herein disclosed, referring particularly to Figure 11, comprises a manifold 80 which is in communication with a source of air under pressure through means of a line 81, an air filter 82 being interposed in the line 81. A line 83 extends from the manifold 80 to the upper end of the cylinder 62, a two-way speed control valve 84 and a two-way solenoid operated valve 85 being interposed in this line. Branching from the line 83, is an exhaust line 86 leading to atmosphere, a two-way solenoid operated valve 87 controlling passage of air through this line.

A line 88 extends from the manifold 80 to the hollow piston rod 65, to establish communication between the manifold 80 and the space between the pistons 71 and 72. A two-way speed control valve 89 is interposed in the line 88, as well as a two-way solenoid operated valve 90, a lubricator 91, and a pressure regulator 92. A branch line 93 leads from the line 88 to atmosphere, a two-way solenoid operated valve 94 being interposed in this branch line to control air flow therethrough. A branch line 95 leads from the line 88 to a tank 96 which acts as a pressure accumulator. A globe valve 97 controls flow of air through the line 95. A branch line 98 also leads from the line 88 and terminates in a T, one end 99 leading to atmosphere, but controlled by a globe valve 100, and the other line 101 leading to a pressure gauge 102, a stop cock 103, having a reduced orifice, controlling flow of air to the gauge.

A line 104 leads from the manifold 80 to the lower end of the cylinder 62, two-way solenoid operated valves 105 and 106 and a pressure regulator 107 being interposed in this line. A two-way solenoid valve 108 controls exhaust of air from the line 104 to atmosphere. A pressure storage tank 109, globe valve 110, stop cock 111 and pressure gauge 112 being connected in the line 104 in the same manner as described in connection with interposition of similar parts with respect to the line 88. A line 113 extends from the manifold 80 to the line 104, a swing check valve 114 and pressure regulator 115 being interposed in this line.

The parts in Figure 11 are shown in the position assumed when the machine is idle prior to welding, with the control current on. If the control current is shut off, the valves 94 and 105 automatically close. A foot switch (not shown) is provided to actuate the solenoid valves 85 and 87, so as to open either one, or close both as shown. With the valve 87 closed, and the valve 85 opened, air will flow from the manifold 80 to the upper end of the cylinder 62 so as to lower the piston 72 until the hub 74 abuts the adjacent upper surface of the header 63. The piston 72 is then raised only when large-flanged pieces are to be interposed between the welding points.

A starter control 116 and sequence control 117 (see Figure 10) are provided for operation of the welding machine. A three phase power input connection 118 leads to a transformer and condenser discharge control panel 119 which cooperates with the welding machine. The welding transformer 120 is connected to the control panel 119 and opposite ends of the transformer secondary are connected to respective ones of the welding points 23 and 29. The starter control 116 is connected to operate the solenoid valves 90 and 94. The micrometer switch 51 is connected to a relay 121 so that when this switch is closed the relay initiates the discharge of the condensers in the control panel 119 through the welding transformer 120 and thus supplies the welding current to the electrode points 23 and 29. Also, the relay 121, operating through the sequence control 117 and time control mechanism therein, operates the solenoid valves 105 and 108 to effect the application of forging pressure (hereinafter described) a given time interval after the welding operation has been initiated.

In operation, the hand wheel 75 is so adjusted that the piston 72 limits upward movement of the piston 71, with the upward limit of movement of piston 71 being such that the work piece may be properly moved into welding position between the welding points or dies. The piston 72 is normally held down to its lowermost position with hub 74 of the hand wheel in engagement with the header 63 by means of pressure passed to the upper side of the piston 72 by the line 83 from the manifold 80.

Air under pressure is passed to the under side of the piston 71 through line 104 from the manifold 80, and air is passed from manifold 80 through line 88, through hollow piston rod 65 to the space intermediate the pistons 71 and 72. The pressure regulators 92 and 107, respectively in lines 88 and 104 are so adjusted that the air pressure between the pistons 71 and 72 is greater than the air pressure on the under side of piston 71. For example, in certain installations, the air pressure between the pistons 71 and 72 is about 80 pounds per square inch, and the air pressure against the under side of piston 71 is about 20 pounds per square inch, leaving a resultant welding pressure of about 60 pounds per square inch.

The solenoid valves are all constructed and arranged to close with no current on such as when the line switch 125 is open. When the line switch 125 is closed, the electrical circuit is such that valve 90 is closed, valve 94 is opened, and valve 105 is opened and valve 108 is closed. The valves 85 and 87 are operated by a separate control, and should be in position wherein valve 85 is open and valve 87 is closed. The hub 74 of hand wheel 75 has flange 126 which engages a switch 127, the latter closing contacts which permit subsequent operation of the electrical control system, and also open valve 106.

In this condition of parts, air is admitted to the under side of piston 71 to raise this piston to its upper limit defined by abutment with the piston 72. The operator then actuates the starter control 116 which energizes motor 90—94, so as to open valve 90 and close valve 94, thus providing for the flow of air between pistons 71 and 72, so that the resultant pressure forces piston 71 downwardly. This is the welding pressure which forces upper welding point or die 29 in the direction to engage the work piece between it and the lower welding point or die 23. This pressure will cause deflection of the springs 36 and 38, and at predetermined deflection the micro-switch 51 is closed, and this closing operates the relay 121 to initiate the flow of welding current from the control panel 119 through the transformer 120 and thence to the electrodes 23 and 29.

Also, micro-switch 51, operating through the relay 121, starts into operation, through the sequence control panel 117, a time delay mechanism which is adapted after a predetermined and selected time to close valve 105 and open valve 108 to atmosphere. Thus, the air pressure acting on the under side of piston 71 is suddenly released and instead of only the resultant welding pressure being applied to the work piece, a forging pressure, which is the total pressure through line 88, is applied to the work piece. After a selected period of forging pressure, the valve 90 is closed, valve 94 is opened to atmosphere, valve 105 is opened, and valve 108 is closed. Thus, the machine is ready for another welding operation.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. An electrical resistance welder, comprising: electrode carrying means, movable toward and away from a work surface; means urging said electrode carrying means in a direction toward said work surface so that the electrode bears against said work surface; the point of engagement of said electrode point with said work surface and the point of application of the force of said urging means being such as to tend to deflect said electrode carrying means in a predetermined direction; and means, for urging said electrode carrying means in a direction opposite to that of deflection, to at least partially provide against skidding of said electrode along said work surface.

2. An electric resistance welding machine having electrodes movable relative to each other, comprising: slide means, held to movement along ways of said machine in a direction to and from a work surface; means carrying a movable electrode; and spaced-apart lever means, each having a certain amount of resiliency, connecting said slide means and said electrode carrying means.

3. An electric resistance welding machine having electrodes movable relative to each other, comprising: slide means, held to movement along ways of said machine in a direction to and from a work surface; means carrying a movable electrode; and spaced-apart lever means each having a certain amount of resiliency; one of said lever means connecting the top portions and the other of said lever means connecting the bottom portions of said slide means and said electrode carrying means.

4. Electric resistance welding apparatus, comprising: slide means, movable in a direction toward and away from the work piece; an electrode carrier; leaf spring means, connecting said electrode carrier with said slide means; means for moving said slide means so that the electrode engages the work piece sufficiently to cause stressing of said spring means; and means providing for flow of welding current when said leaf spring means has been stressed a selected amount.

5. In combination: slide means; and work engaging means connected to said slide means, said connection comprising leaf spring means.

6. In combination: slide means; and work engaging means connected to said slide means, said connection comprising forged steel leaf spring means containing substantially 80% carbon and hardened to about 40–42 C Rockwell.

7. In combination: slide means; and work engaging means connected to said slide means, said connection comprising spaced apart leaf spring means, one being substantially flat and the other angled, and being so constructed and arranged that relative movement of said work engaging means with respect to said slide means causes tilting of said work engaging means.

8. In an electric resistance welding machine, slide means held to movement along ways carried by said machine, leaf spring means, and low inertia work engaging means having connection with said slide means only through the medium of said leaf spring means.

9. An electric resistance welding machine, comprising: frame means; slide means held to reciprocatory movement along ways carried by said frame means; electrode carrying means; and leaf spring means, connecting said electrode carrying means for movement with said slide means.

10. In an electric resistance welding machine having one or both electrodes movable relative to each other, low inertia apparatus for causing the movable electrode to follow up and properly engage the work surface during the welding operation, comprising: slide means, held to reciprocatory movement along ways carried by said machine in a direction toward and away from the work; electrode carrying means; and leaf spring means, connecting said electrode carrying means for movement with said slide means, yet being yieldable to provide for relative movement therebetween after a predetermined resistance to movement is encountered by said electrode carrying means, said leaf spring means storing energy during said relative movement, the stored energy urging said movable electrode against the work surface as this surface recedes with respect to the electrodes during the welding operation.

11. In combination: work engaging means, movable toward and away from a work piece; means for urging said work engaging means into engagement with said work piece; and leaf spring means providing lever connection between said work engaging means and said urging means and providing for relative movement therebetween when opposition to movement is encountered by said work engaging means and certain pressure is applied to said urging means, said lever connection, during said relative movement, causing lateral movement of at least a portion of said work engaging means with respect to said urging means.

12. An electric resistance welding machine having electrodes movable relative to each other, comprising: slide means, held to movement along ways of said machine in a direction to and from a work piece; means carrying an electrode; and a plurality of lever means connecting said slide means and said electrode carrying means, said lever means being swingable in different arcs which are so related as to urge said electrode carrying means to tilt in a predetermined direction.

13. In combination: work engaging means, movable toward or away from a work piece; means urging said work engaging means toward engagement with said work, said work engaging means being subject to deflection in certain manner upon application of force against resistance by engagement with said work piece, and connection means between said work engaging means and said urging means providing for relative movement therebetween, and incorporating resiliency tending to maintain them in certain relationship, and also incorporating means operable upon said relative movement to urge said work engaging means in a direction opposing deflection movement.

14. In combination: work engaging means, movable toward and away from a work piece; means urging said work engaging means toward engagement with said work piece, said work engaging means being subject to deflection in a certain manner upon application of force against resistance by engagement with said work piece; and connection means for connecting said work engaging means and said urging means, incorporating resiliency and comprising lever means swingable to urge said work engaging means in a direction opposed to deflection movement.

15. An electric resistance welding machine having electrodes movable relative to each other, comprising: electrode carrying means, movable toward or away from a work piece; means urging said electrode carrying means so that its electrode engages with said work piece; the point of electrode engagement and the point of application of force on said work engaging means being out of alignment so that said electrode carrying means has a tendency to deflect in a certain direction; and connection means for connecting said electrode carrying means and said urging means, incorporating resiliency and comprising a plurality of lever means swingable in different arcs which are so related to urge said work engaging means in a direction opposed to deflection movement.

16. In combination: work engaging means, movable toward and away from a work piece; means for urging said work engaging means into engagement with said work piece, said work engaging means being subject to deflection caused by application of force of said urging means; and connection means between said work engaging means and said urging means, providing for unisonal movement of said work engaging means and said urging means under certain conditions, and also providing for relative movement of said work engaging means and said urging means under certain other conditions, said connection means, during said relative movement setting up urging force opposing deflection of said work engaging means.

GEORGE B. MARTIN.

REFERENCES CITED

The following references are of record in the file of this patent:

UNITED STATES PATENTS

| Number | Name | Date |
|---|---|---|
| 1,174,446 | Rietzel | Mar. 7, 1916 |
| 2,253,702 | Hall | Aug. 26, 1941 |
| 2,276,770 | Green | Mar. 17, 1942 |
| 2,331,537 | Clark | Oct. 12, 1943 |
| 2,343,686 | Martindell | Mar. 7, 1944 |
| 2,365,148 | Clark | Dec. 12, 1944 |
| 2,421,021 | Elwood | May 27, 1947 |